(12) United States Patent
Saint-Jean, Jr.

(10) Patent No.: US 11,986,084 B2
(45) Date of Patent: May 21, 2024

(54) MOBILE TRAILER-CLEANING SYSTEM

(71) Applicant: Eugene Saint-Jean, Jr., Miami, FL (US)

(72) Inventor: Eugene Saint-Jean, Jr., Miami, FL (US)

( * ) Notice: Subject to any disclaimer, the term of this patent is extended or adjusted under 35 U.S.C. 154(b) by 473 days.

(21) Appl. No.: 17/367,290

(22) Filed: Jul. 2, 2021

(65) Prior Publication Data

US 2022/0000255 A1     Jan. 6, 2022

Related U.S. Application Data

(63) Continuation-in-part of application No. 29/765,748, filed on Jan. 11, 2021, now Pat. No. Des. 956,427, and a continuation-in-part of application No. 29/749,478, filed on Sep. 4, 2020, now Pat. No. Des. 956,428.

(60) Provisional application No. 63/047,823, filed on Jul. 2, 2020.

(51) Int. Cl.
*B60S 3/06* (2006.01)
*A46B 5/00* (2006.01)
*A46B 13/02* (2006.01)

(52) U.S. Cl.
CPC ............ *A46B 13/023* (2013.01); *A46B 5/007* (2013.01); *B60S 3/06* (2013.01); *A46B 2200/30* (2013.01)

(58) Field of Classification Search
CPC ............... B60S 3/06; B60S 3/02; A46B 13/02
See application file for complete search history.

(56) References Cited

U.S. PATENT DOCUMENTS

| 4,450,600 A | 5/1984 | Shelstad | |
|---|---|---|---|
| 2016/0278512 A1* | 9/2016 | Allen-Gipson | A46B 13/001 |
| 2016/0311407 A1* | 10/2016 | Belanger | B60S 3/04 |
| 2016/0311408 A1* | 10/2016 | Belanger | B60S 3/063 |
| 2017/0063293 A1* | 3/2017 | Parrott | B08B 1/002 |
| 2018/0281753 A1* | 10/2018 | Conny | B08B 1/002 |

FOREIGN PATENT DOCUMENTS

CH     674729 A5     7/1990

OTHER PUBLICATIONS

ITECO, Iteco Easy Wash E50—Electric Mobile Single Brush Wash for buses, coaches and HGV's, www.hhands.co.uk, Mar. 2020.
Transport Wash Systems, Single Brush Wash Systems Buyers guide for single brush wash systems, transportwashsystems.com, May 2017.

* cited by examiner

*Primary Examiner* — Michael D Jennings (57) ABSTRACT

A mobile trailer-cleaning system is a system that facilitates the cleaning of the exterior surfaces of a trailer. The system may include at least one brush assembly, a roof carriage, an agitation mechanism, and a steering assembly. The at least one brush assembly enables the cleaning of all the trailer's exterior surfaces including the rear of the trailer and any non-flat surfaces. The roof carriage serves as a guide to maintain the at least one brush assembly adjacent to the trailer's walls as the at least one brush assembly moves along the trailer. The roof carriage also prevents the at least one brush assembly from tipping over. The agitation mechanism eases the cleaning of the trailer's exterior surfaces by agitating the at least one brush assembly in predetermined modes of operation. The steering assembly enables the user to manually operate the at least one brush assembly during the cleaning process.

16 Claims, 10 Drawing Sheets

MOBILE TRAILER-CLEANING SYSTEM

The current application claims a priority to a U.S. provisional application Ser. No. 63/047,823 filed on Jul. 2, 2020.

The current application is also a continuation-in-part (CIP) application of the U.S. design application Ser. No. 29/765,748 filed on Jan. 11, 2021. The U.S. design application Ser. No. 29/765,748 is a CIP application of the U.S. design application Ser. No. 29/749,478 filed on Sep. 4, 2020.

FIELD OF THE INVENTION

The present invention relates generally to trailer accessories and cleaning systems. More specifically, the present invention is a trailer-cleaning system designed to be mobile so that the user can deploy the system wherever necessary.

BACKGROUND OF THE INVENTION

Trailers are widely used to transport different cargo across long distances. Due to the constant use of trailers, regular maintenance is required to prolong the durability of the trailers, such as keeping the outside of the trailer clean and free of debris. Washing a trailer down is a mandatory but exhausting process. Due to the sheer size of most trailers, it could take a team of individuals hours to clean the trailer. The most exhaustive part of the cleaning process is the scrubbing of the sides of the trailer. Currently, there are various trailer cleaning systems that enable people to clean the sides of the trailer. However, these brushing or cleaning systems are often located in fixed, and sometimes remote, locations that the trailer needs to be taken to as few trailer parking locations are equipped with such systems. There is no system that can efficiently scrub the sides of a trailer in place of an actual team that can be easily transported and deployed by a single person or few people. Therefore, there is a need for a mobile system that can easily moved and deployed to clean a trailer without the need of multiple people.

An objective of the present invention is to provide a mobile trailer-cleaning system that enables a single person to clean the outside surfaces of a trailer easily and efficiently. Another objective of the present invention is to provide a system that can be easily deployed and adjusted to fit the exterior structure of the trailer to avoid causing damage to the trailer. Another objective of the present invention is to provide a system that can be operated by a single user or few people without the need of an external source of power. Additional features and benefits of the present invention are further discussed in the sections below.

SUMMARY OF THE INVENTION

The present invention is a mobile trailer-cleaning system designed to facilitate the cleaning of the exterior surfaces of any trailer. The present invention improves the trailer cleaning process by removing the need of a team of people to wash the trailer. The present invention also eliminates the need to move the trailer to a remote location to use other cleaning systems to clean the trailer. The present invention includes a modular design that is easily assembled or disassembled. The modular design of the present invention also enables the replacement of the different components for maintenance purposes or to upgrade the components. The present invention enables manual or automatic operation of the system, which allows the user to focus on other aspects of the trailer cleaning process such as spraying the trailer with water and soap. Various cleaning attachments such as a spray mechanism to dispense cleaning materials or an undercarriage cleaning attachment are provided to help the user better clean the trailer's exteriors. Additionally, the present invention can be configured in multiple ways to target different areas of the trailer, such as the rear of the trailer where surfaces or non-flat surfaces. Thus, the user can efficiently clean the trailer without damaging the exterior surfaces or any other ornaments on the trailer.

DETAIL DESCRIPTIONS OF THE INVENTION

All illustrations of the drawings are for the purpose of describing selected versions of the present invention and are not intended to limit the scope of the present invention.

The present invention is a mobile trailer-cleaning system that facilitates the cleaning of the exterior surfaces of a trailer. The present invention enables the cleaning of the trailer's exteriors without damaging the exterior surfaces or any attachment placed on the exterior of the trailer. As can be seen in FIG. 1 through 5, the present invention may comprise at least one brush assembly 1, a roof carriage 9, an agitation mechanism 13, and a steering assembly 18. The at least one brush assembly 1 enables the cleaning of all the trailer's exterior surfaces including the rear of the trailer.

The roof carriage 9 serves as a guide to maintain the at least one brush assembly 1 adjacent to the trailer's lateral walls. The roof carriage 9 also prevents the at least one brush assembly 1 from tipping over. The agitation mechanism 13 eases the cleaning of the trailer's exterior surfaces by agitating the at least one brush assembly 1 in predetermined modes of operation. The steering assembly 18 enables the user to manually operate the at least one brush assembly 1 or to set the present invention for automatic operation.

The general configuration of the aforementioned components enables the user to easily clean the exterior of the trailer without requiring the help of additional people or additional cleaning tools. As can be seen in FIG. 1 through 5, the at least one brush assembly 1 is designed to scrub the exterior surfaces of trailer with the use of water and/or cleaning chemicals the user chooses to use. The at least one brush assembly 1 comprises a support column 2, a plurality of bristle sets 5, a base structure 7, and a wheel assembly 8. The support column 2 positions the plurality of bristle sets 5 in such a way that the plurality of bristle sets 5 can reach most of the lateral surfaces of the trailer. The base structure 7 is designed to receive the load from the support column 2 and the plurality of bristle sets 5. The base structure 7 also prevents the support column 2 from tipping over as the plurality of bristle sets 5 is rubbed against the lateral exterior surfaces of the trailer. The wheel assembly 8 enables the base structure 7 to be moved along the trailer during the cleaning process. The wheel assembly 8 can include multiple wheels to help maintain the balance of the overall structure or a pair of wheels with an integrated balancing mechanism. Moreover, the roof carriage 9 comprises a carriage body 10, a plurality of rollers 11, and at least one extension arm 12. The carriage body 10 is designed to stabilize the roof carriage 9 on top of the trailer's roof. The plurality of rollers 11 enables the carriage body 10 to roll on top of the trailer's roof. The at least one extension arm 12 connects the carriage body 10 to the at least one brush assembly 1. The support column 2 is preferably an elongated tubular structure with a length long enough to span the height of the trailer. The support column 2 comprises a first column end 3 and a second column end 4 corresponding to the opposing ends of the support column 2. In some embodiments, the present invention may also include various cleaning attachments such as a spray mechanism or an undercarriage attachment that further improve the cleaning process of the trailer.

Figure 9:
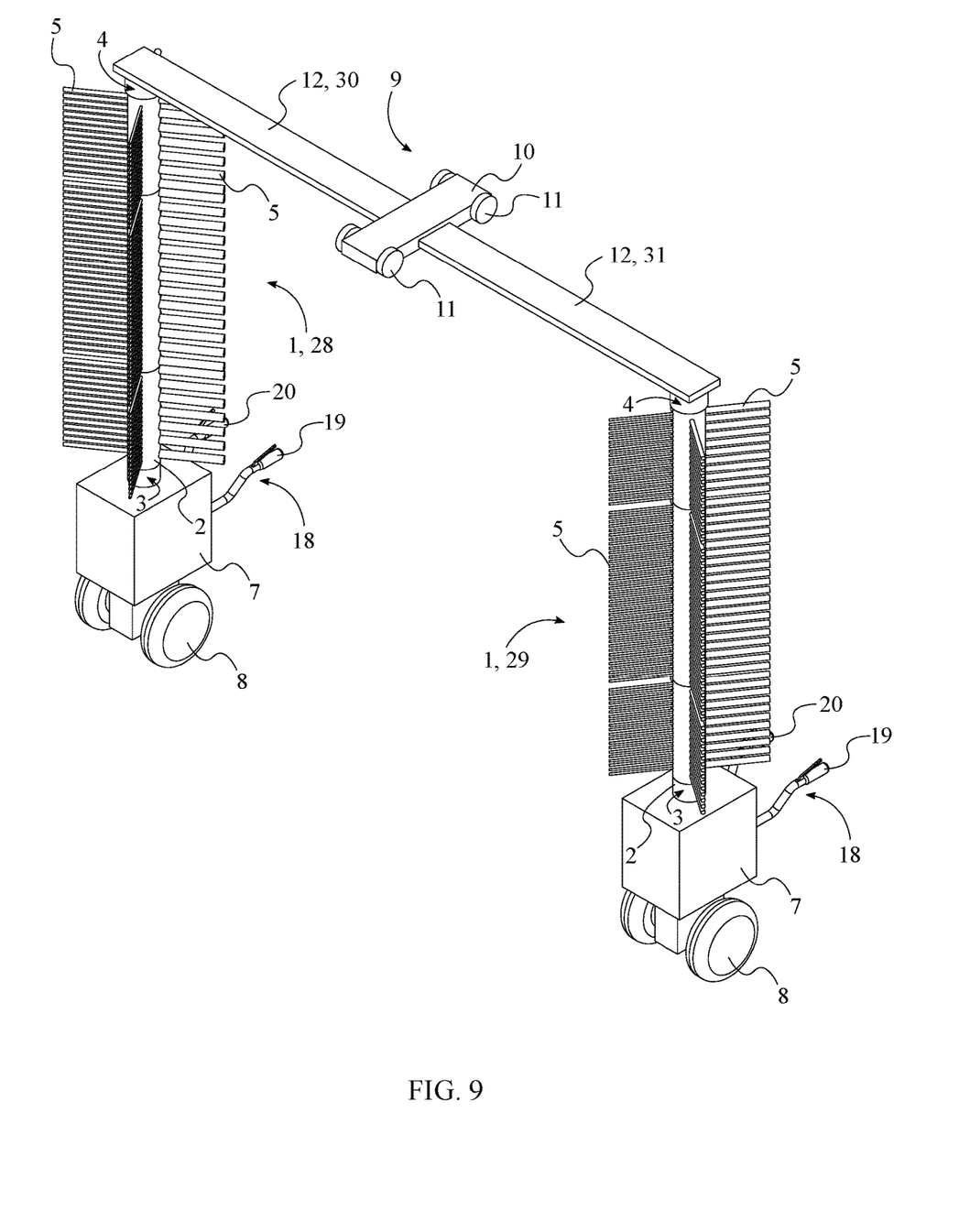
FIG. 9 is a front top perspective view showing the present invention, wherein the at least one extension arm is shown as a first extension arm and a second extension arm.
Figure 10:
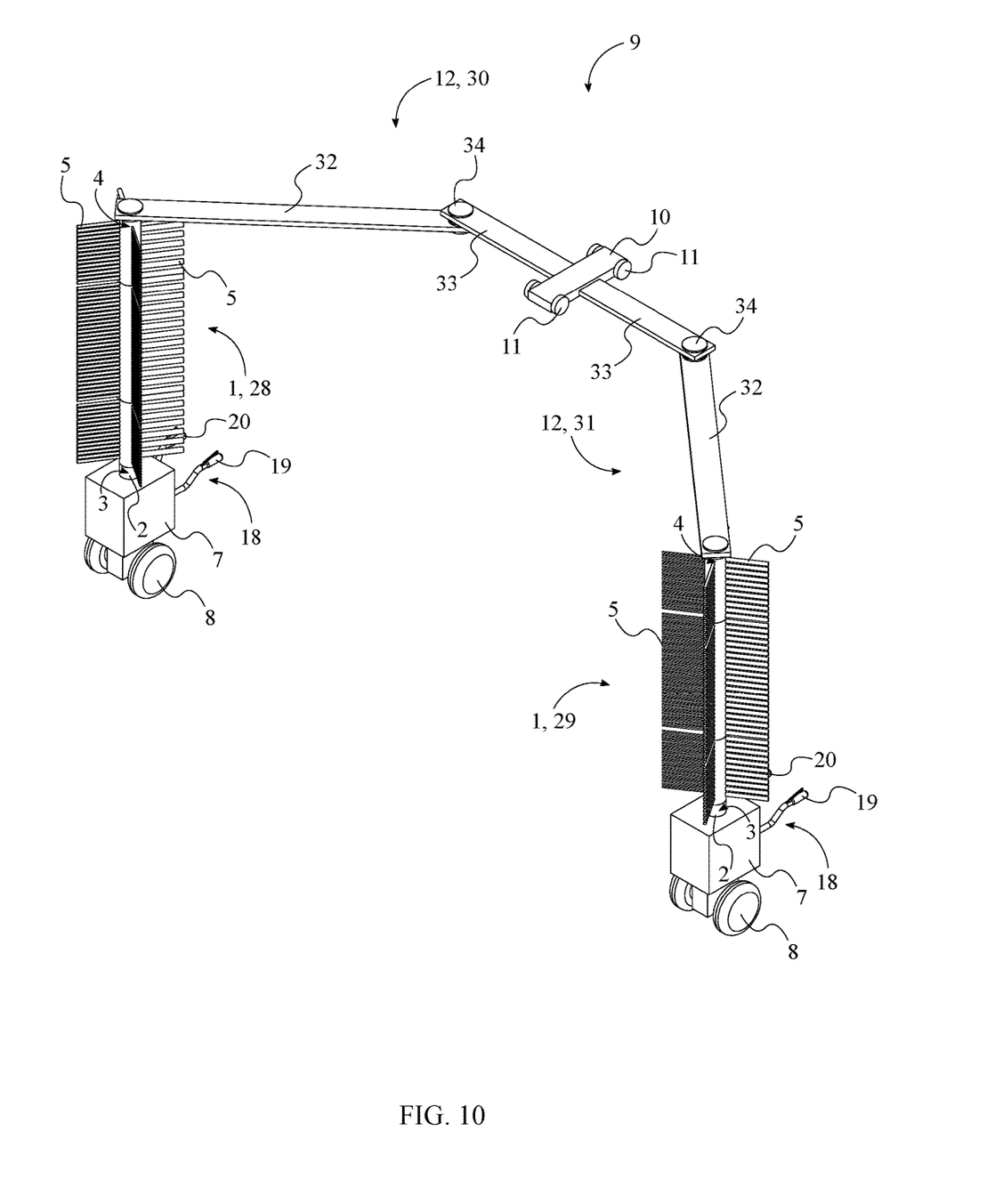
FIG. 10 is a front rear perspective view showing the present invention, wherein the first extension arm and the second extension arm are shown with a distal arm section, a proximal arm section, and an arm joint.

As can be seen in FIGS. 9 and 10, the plurality of rollers 11 is rotatably mounted to the carriage body 10 so that the load of the carriage body 10 rests on the plurality of rollers 11. The carriage body 10 is terminally mounted to the at least one extension arm 12 so that the carriage body 10 can be positioned at a distance from the lateral edge of the trailer's roof. The second column end 4 is terminally mounted to the at least one extension arm 12, opposite to the carriage body 10. Thus, the carriage body 10 is secured to the support column 2 by the at least one extension arm 12. In some embodiments, the carriage body 10 and/or the at least one extension arm 12 are replaceable components that can be easily attached to the support column 2 using different releasable fasteners such as a snap and twist fastening mechanism. The carriage body 10 and/or the at least one extension arm 12 can be replaced with a spray mechanism designed to dispense cleaning materials to the exterior surfaces of the trailer to aid with the cleaning process. Further, the first column end 3 is mounted adjacent to the base structure 7 to secure the support column 2 to the base structure 7. The wheel assembly 8 is mounted adjacent to the base structure 7, opposite to the first column end 3, so that the base structure 7 rests on the wheel assembly 8. The steering assembly 18 is mounted adjacent to the base structure 7, in between the first column end 3 and the wheel assembly 8, so that the steering assembly 18 is accessible to the user. Further, the plurality of bristle sets 5 is distributed about the support column 2 so that the plurality of bristle sets 5 covers most of the cylindrical lateral surface of the support column 2. Each of the plurality of bristle sets 5 provides different types of bristles to improve the cleaning process of the trailer. Each of the plurality of bristle sets 5 is also distributed along the support column 2 so that multiple bristle sets of the plurality of bristle sets 5 is available throughout the length of the support column 2 for efficient cleaning of the surfaces. The plurality of bristle sets 5 is also laterally mounted onto the support column 2 to secure each of the plurality of bristle sets 5 to the support column 2. In other embodiments, the plurality of bristle sets 5 may include a single type of bristles instead of a combination of different types of bristles.

Figure 1:
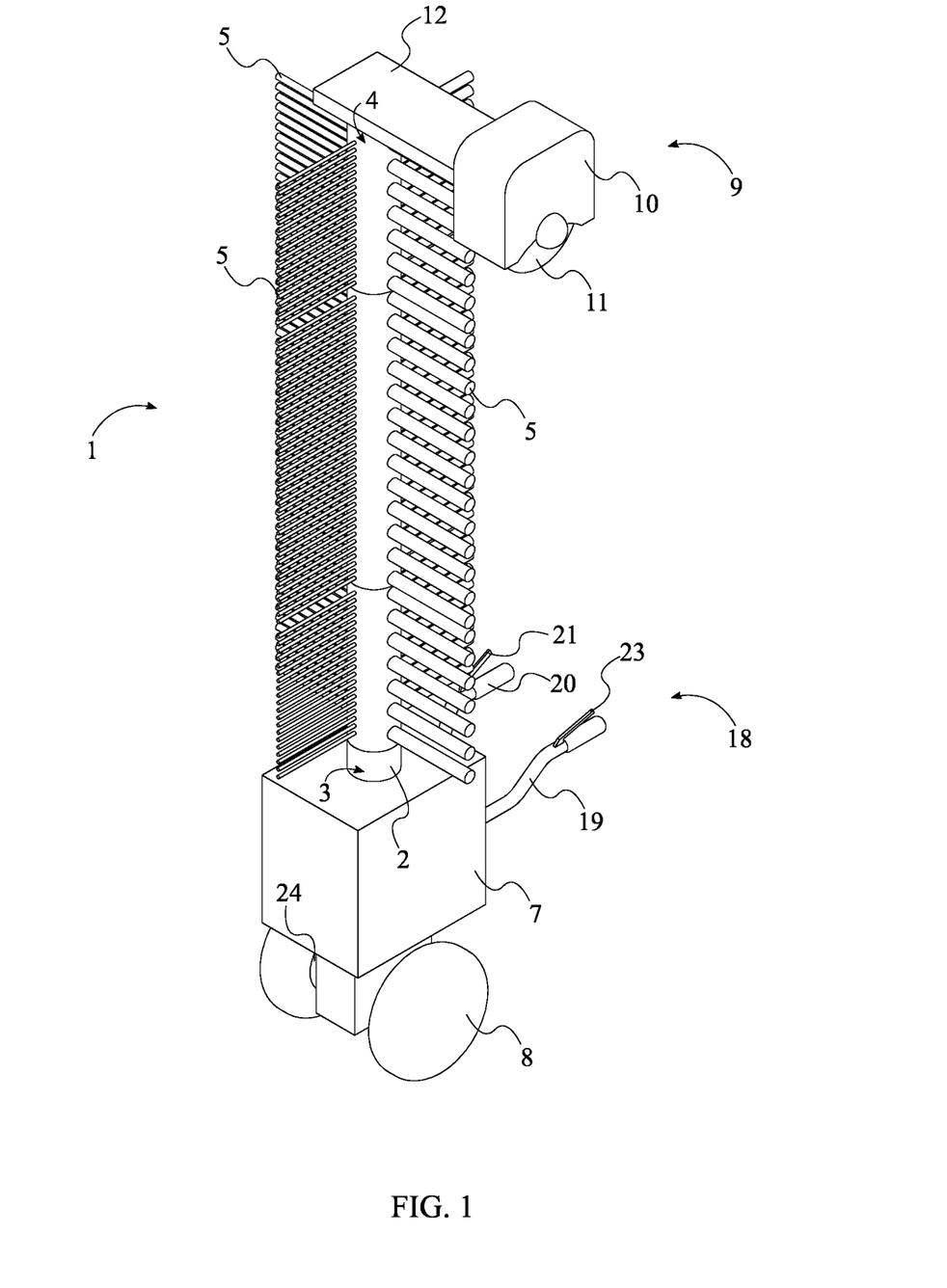
FIG. 1 is a front top perspective view showing the present invention, wherein the at least one brush assembly is shown as an individual unit.
Figure 2:
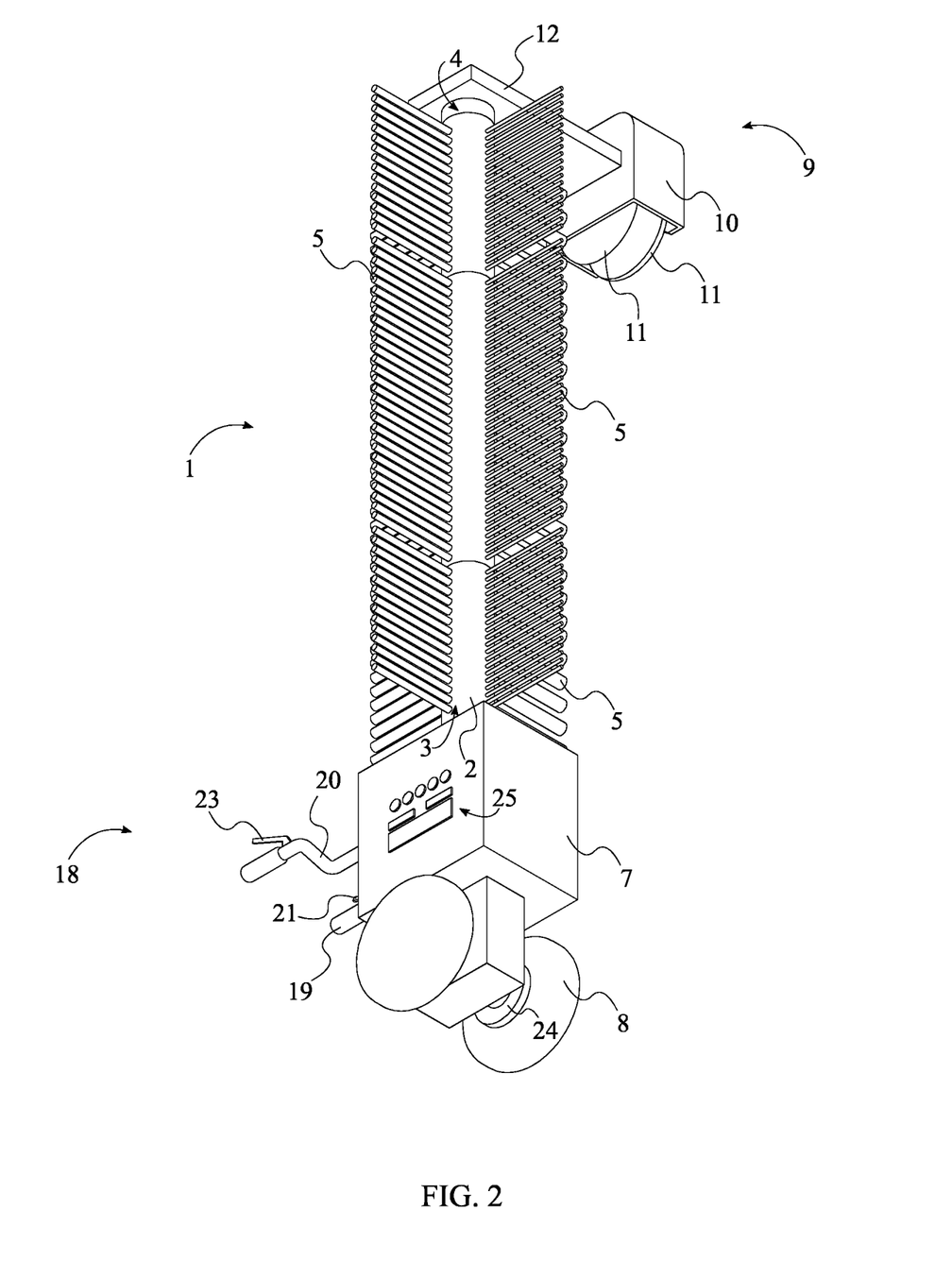
FIG. 2 is a front rear perspective view showing the present invention, wherein the at least one brush assembly is shown as an individual unit.
Figure 5:
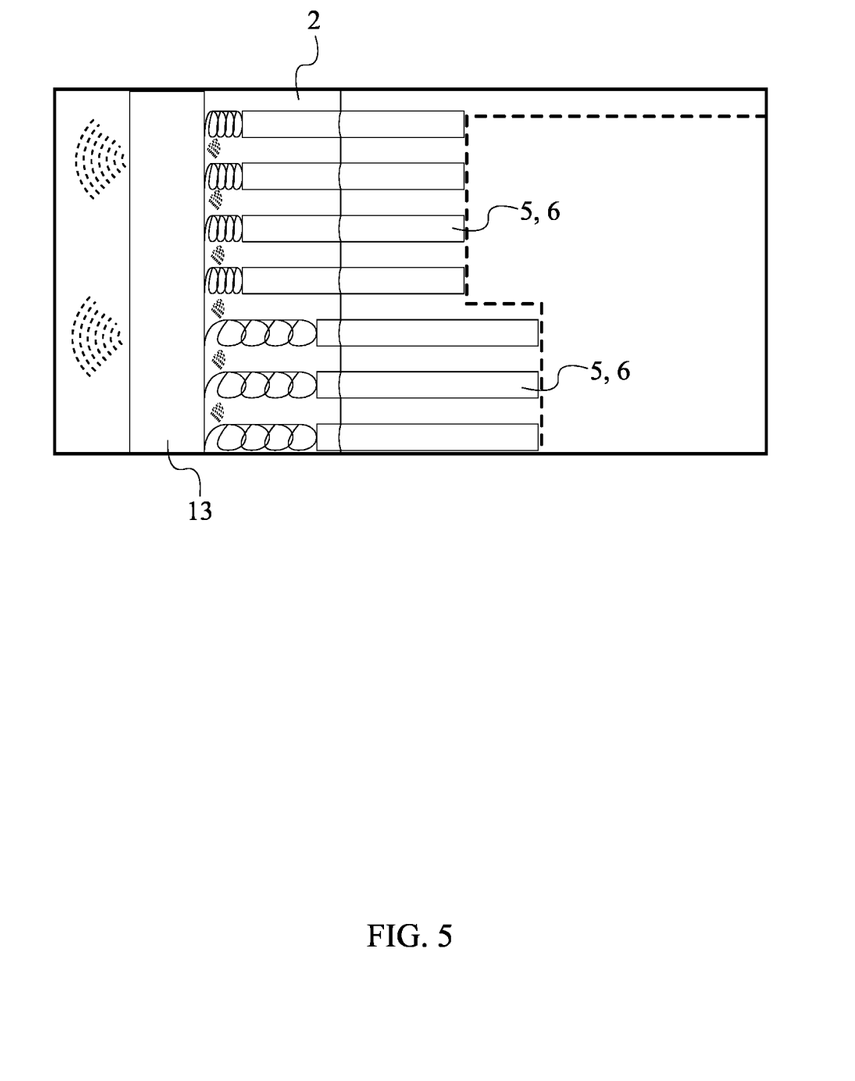
FIG. 5 is a schematic view showing a set of the plurality of bristle sets of the present invention, wherein the plurality of bristle sets is shown as a plurality of spring-loaded bristles.
Figure 6:
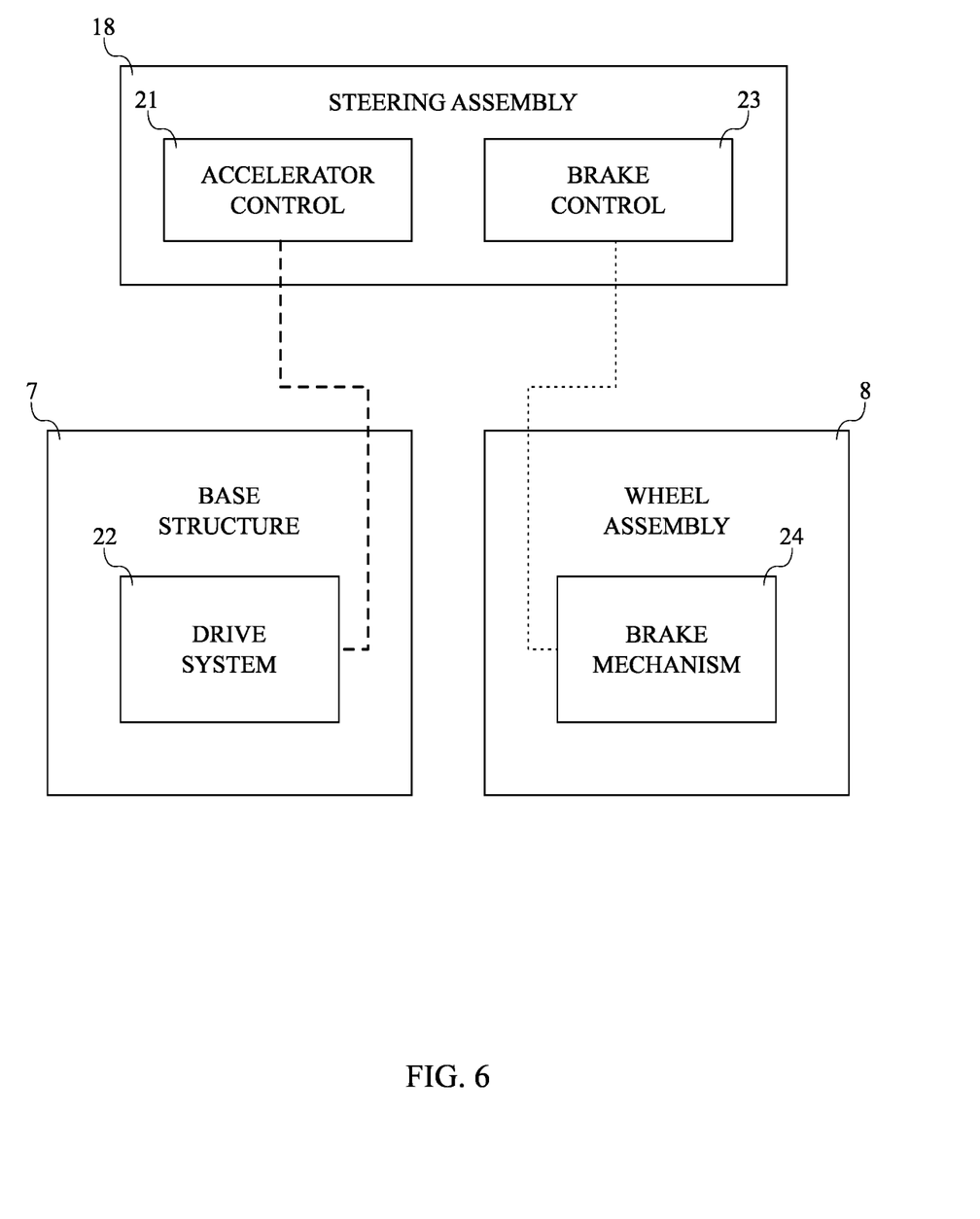
FIG. 6 is a schematic view showing the at least one accelerator control, the at least one drive system, the at least one brake control, and the at least one brake mechanism of the present invention, wherein the drive system connections are shown as dashed path lines, and wherein the brake mechanism connections are shown as dotted path lines.

To increase the mobility of the present invention, the present invention may further comprise at least one accelerator control 21 and at least one drive system 22. As can be seen in FIGS. 1, 2, and 5, the at least one accelerator control 21 enables the user to control the speed at which the present invention is moving. The at least one drive system 22 provides the motorized means for the base structure 7 to move without requiring the user to exert force on the base structure 7. The wheel assembly 8 can include a pair of wheels mounted on an axle that enables the rotation of the pair of wheels. The at least one accelerator control 21 is mounted onto the steering assembly 18 so that the at least one accelerator control 21 is accessible to the user. The at least one drive system 22 is mounted within the base structure 7 to protect the electrical components and the electronic components of the at least one drive system 22 from the surroundings. In addition, the at least one drive system 22 is operatively coupled to the wheel assembly 8, wherein the at least one drive system 22 is used to selectively accelerate rotation of the wheel assembly 8. For example, the at least one drive system 22 can include a motor 14 and a transmission mechanism that transmits the torque generated by the motor 14 to the wheel assembly 8. The at least one drive system 22 can be, but is not limited to, either electrically-powered or diesel-powered. The at least one accelerator control 21 is also operatively coupled to the at least one drive system 22, wherein the accelerator control is used to actuate the at least one drive system 22. For example, the at least one accelerator control 21 can include a twist throttle grip that enables the user to control the acceleration of the wheel assembly 8. In other embodiments, the present invention can utilize different motorized means to facilitate the movement of the present invention.

To help the user to slow down the movement of the present invention or to bring the present invention to a stop, the present invention may further comprise at least one brake control 23 and at least one brake mechanism 24. As can be seen in FIGS. 1, 2, and 5, the at least one brake mechanism 24 enables users to control the speed of the moving present invention. The at least one brake control 23 provides the user with the ability to engage the at least one brake mechanism 24, as necessary. The at least one brake control 23 is mounted onto the steering assembly 18 so that the at least one brake control 23 is always accessible to the user. The at least one brake mechanism 24 is operatively integrated into the wheel assembly 8, wherein the at least one brake mechanism 24 is used to selectively decelerate rotation of the wheel assembly 8. For example, the at least one brake mechanism 24 can include a pair of disk brake assemblies mounted onto the pair of wheels of the wheel assembly 8. Further, the at least one brake control 23 is operatively coupled to the at least one brake mechanism 24, wherein the at least one brake control 23 is used to actuate the at least one brake mechanism 24. For example, the at least one brake control 23 is a spring-loaded brake lever connected to the pair of disk brake assemblies to slow the rotation down of the pair of wheels. In other embodiments, the present invention can utilize different brake mechanisms to help the user control the speed of the moving present invention.

Figure 4:
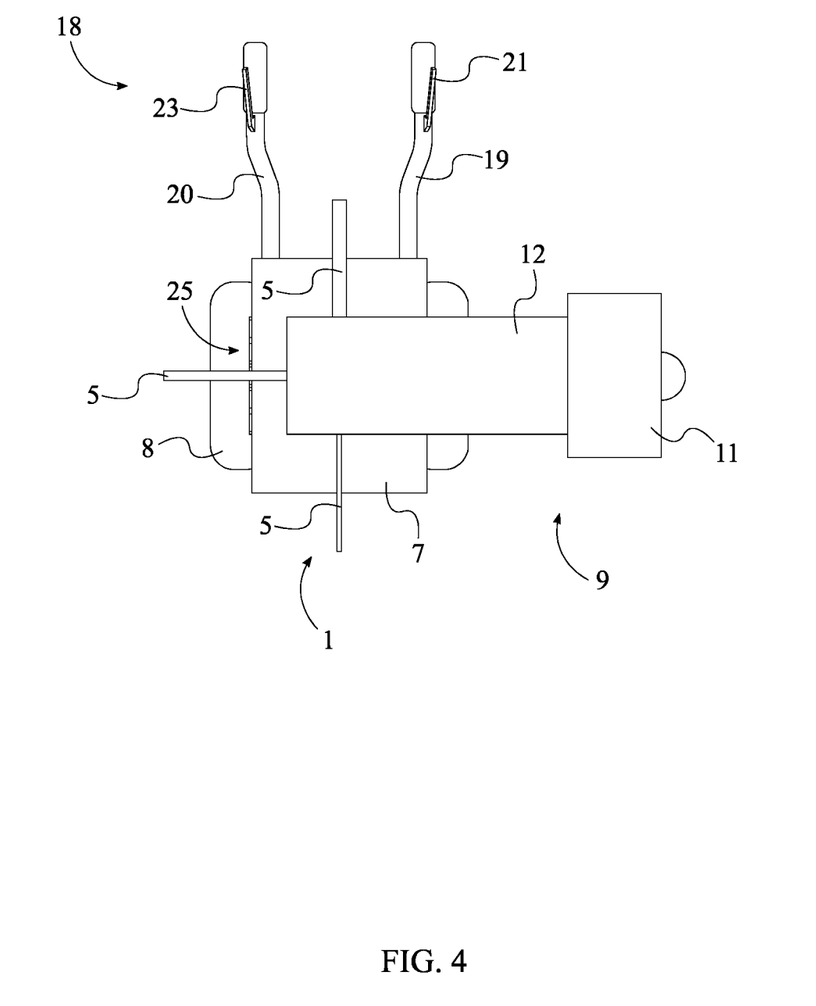
FIG. 4 is a top view showing the present invention, wherein the at least one brush assembly is shown as an individual unit.

As previously discussed, the steering assembly 18 enables the user to physically maneuver the present invention. Due to the size of the present invention, the user may have difficulty maneuvering the at least one brush assembly 1 while cleaning the trailer's exterior surfaces. So, the present invention may further comprise a first handlebar 19 and a second handlebar 20 that enable the users to use both hands to steer the at least one brush assembly 1, as can be seen in FIG. 4. The first handlebar 19 and the second handlebar 20 are positioned adjacent to each other, similar to the handlebars of a wheelbarrow. Likewise, the first handlebar 19 and the second handlebar 20 can each be oriented at an angle with the base structure 7 so that the user can more ergonomically steer the at least one brush assembly 1. The first handlebar 19 and the second handlebar 20 can include grip material on the free ends to further facilitate the handling of the base structure 7. In other embodiments, the steering assembly 18 may include different handlebar designs that are more comfortable to utilize.

Figure 3:
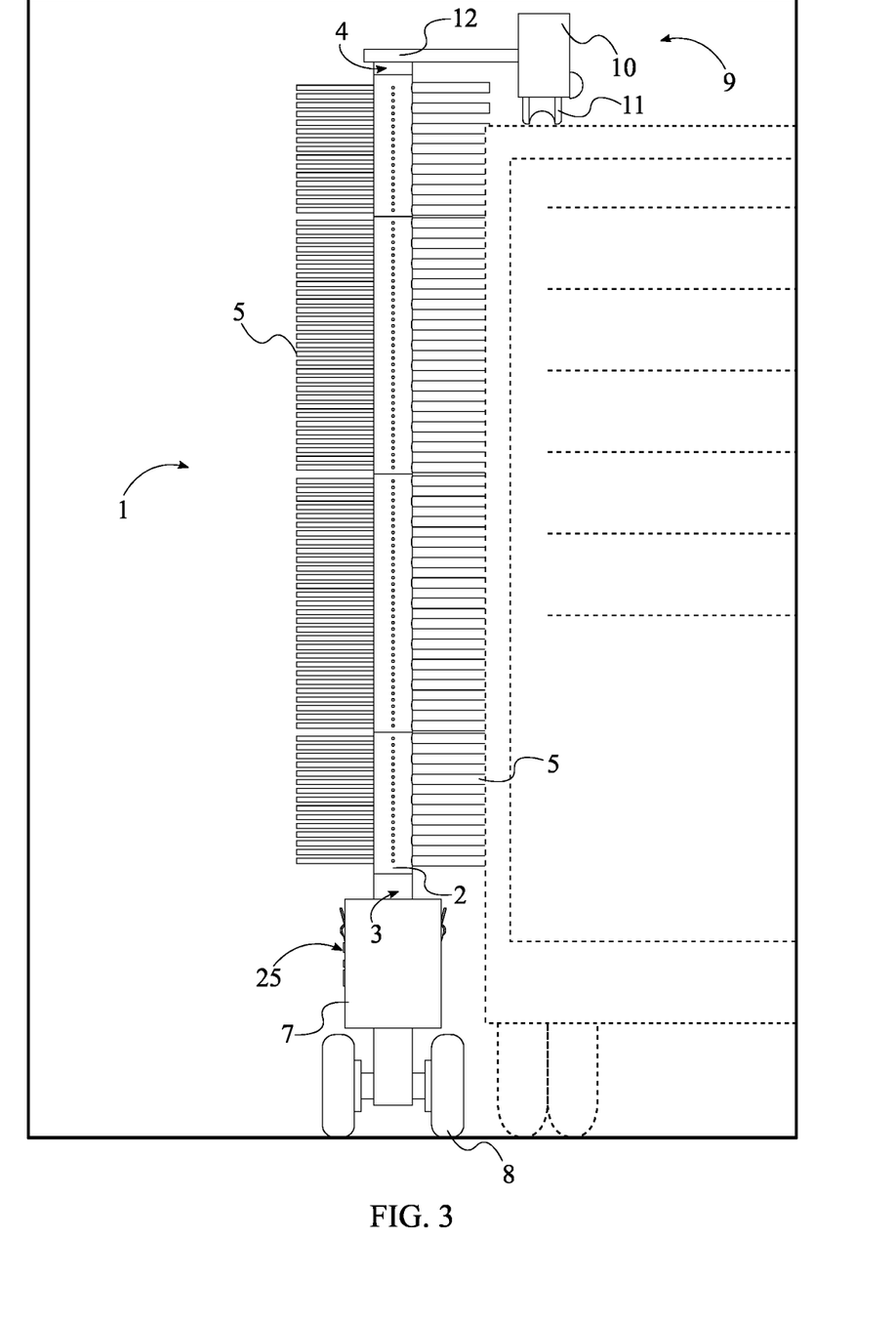
FIG. 3 is a front view showing the present invention, wherein the present invention is shown positioned adjacent to a trailer.

To enable the user to clean most exterior surfaces of the trailer, the present invention can include mechanical means that enable the plurality of bristle sets 5 to reach recessions or deep crevices around the trailer. As can be seen in FIGS. 3 and 5, each of the plurality of bristle sets 5 comprises a plurality of spring-loaded bristles 6 that can extend and retract as each of the plurality of spring-loaded bristles 6 is rubbed against the trailer's exterior surfaces. Thus, each of the plurality of spring-loaded bristles 6 is configured to recoil from an agitated position to an equilibrium position. For example, the plurality of spring-loaded bristles 6 can be in an extended rest position (i.e., the equilibrium position), and as each of plurality of spring-loaded bristles 6 is pressed against the trailer's exterior surfaces, the plurality of spring-loaded bristles 6 retracts to avoid unwanted damage to the trailer's exterior surfaces (i.e., the agitated position). Once the at least one brush assembly 1 is removed from the trailer, the plurality of spring-loaded bristles 6 returns to the extended rest position (i.e., the equilibrium position). This enables the user to transition from the flat lateral walls of the trailer to the recessed door on the rear of the trailer without having to reposition the at least one brush assembly 1. The plurality of spring-loaded bristles 6 also enables users to clean trailer surfaces that may have multiple protrusions or ornamental features such as advertisement decals without worrying about damaging either. In other embodiments, the present invention may utilize different mechanism to avoid damaging the trailer's exterior surfaces or other features mounted onto the different exterior surfaces.

Figure 7:
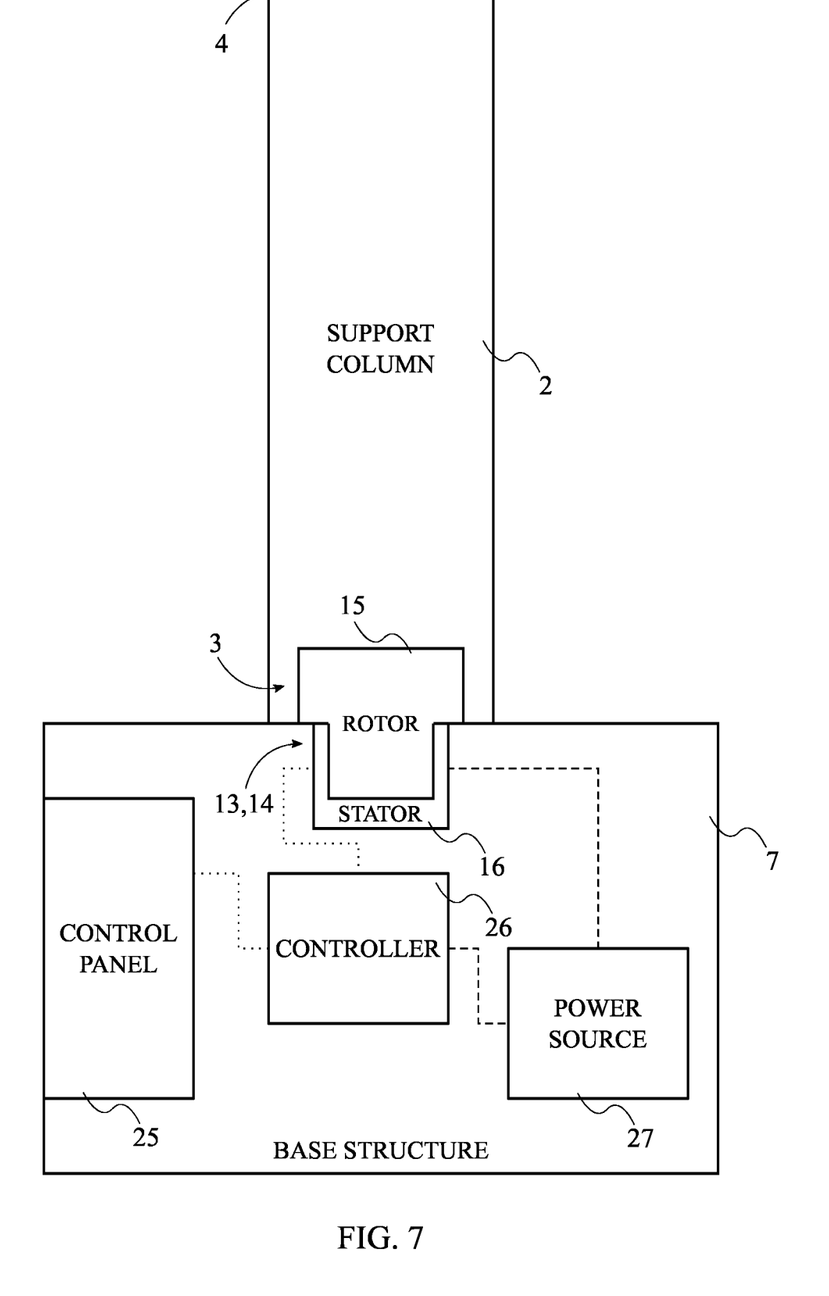
FIG. 7 is a schematic view showing the agitation mechanism as a motor, wherein the electronic connections are shown as dotted path lines, and wherein the electrical connections are shown as dashed path lines.

As previously discussed, the present invention can be operated manually by pushing onto the base structure 7 and moving the plurality of bristle sets 5 against the trailer's exterior surfaces. However, the present invention can also be operated semi-automatically or can be set to operate automatically to clean the exterior surfaces of the trailer. For example, the user can choose the plurality of bristle sets 5 to oscillate, vibrate, or rotate according to the level of cleaning needed. As can be seen in FIG. 7, the present invention may further comprise a control panel 25, a controller 26, and a power source 27. The control panel 25 enables the user to input the commands that dictate the automatic or semiautomatic operation of the present invention. The controller 26 processes the user inputs from the control panel 25 and transmit the processed commands to the appropriate components. Further, the agitation mechanism 13 is a motor 14 being able to be configured through the controller 26 according to the user's desired settings. The motor 14 comprises a rotor 15 and a stator 16. The rotor 15 is the portion of the motor 14 that generates torque that is transmitted to the plurality of bristle sets 5 for the agitation of the bristles. The stator 16 is the portion of the motor 14 that prevents the torque transmission to the base structure 7. The control panel 25 is laterally mounted onto the base structure 7 so that the control panel 25 is accessible to the user. Further, the controller 26 and the stator 16 are mounted within the base structure 7 to isolate the controller 26 and the stator 16 from the surroundings. Similarly, the power source 27 is integrated into the base structure 7 to isolate the electrical components from the surroundings. The power source 27 can include multiple rechargeable batteries but can also include a charging port compatible with a power cable that can be plugged into an external power grid. The first column end 3 is rotatably mounted to the base structure 7 to enable rotation of the support column 2. In addition, the rotor 15 is torsionally connected to the first column end 3. Thus, the motor 14 can transmit torque to the support column 2 to agitate the plurality of bristle sets 5 to clean the exterior surfaces of the trailer. Furthermore, the controller 26 is electronically connected to the control panel 25 and the motor 14 to manage the operation of the motor 14 according to the user inputs on the control panel 25. The power source 27 is also electrically connected to the controller 26 and the motor 14 to provide the voltage necessary for the operation of the motor 14 and the controller 26.

Figure 8:
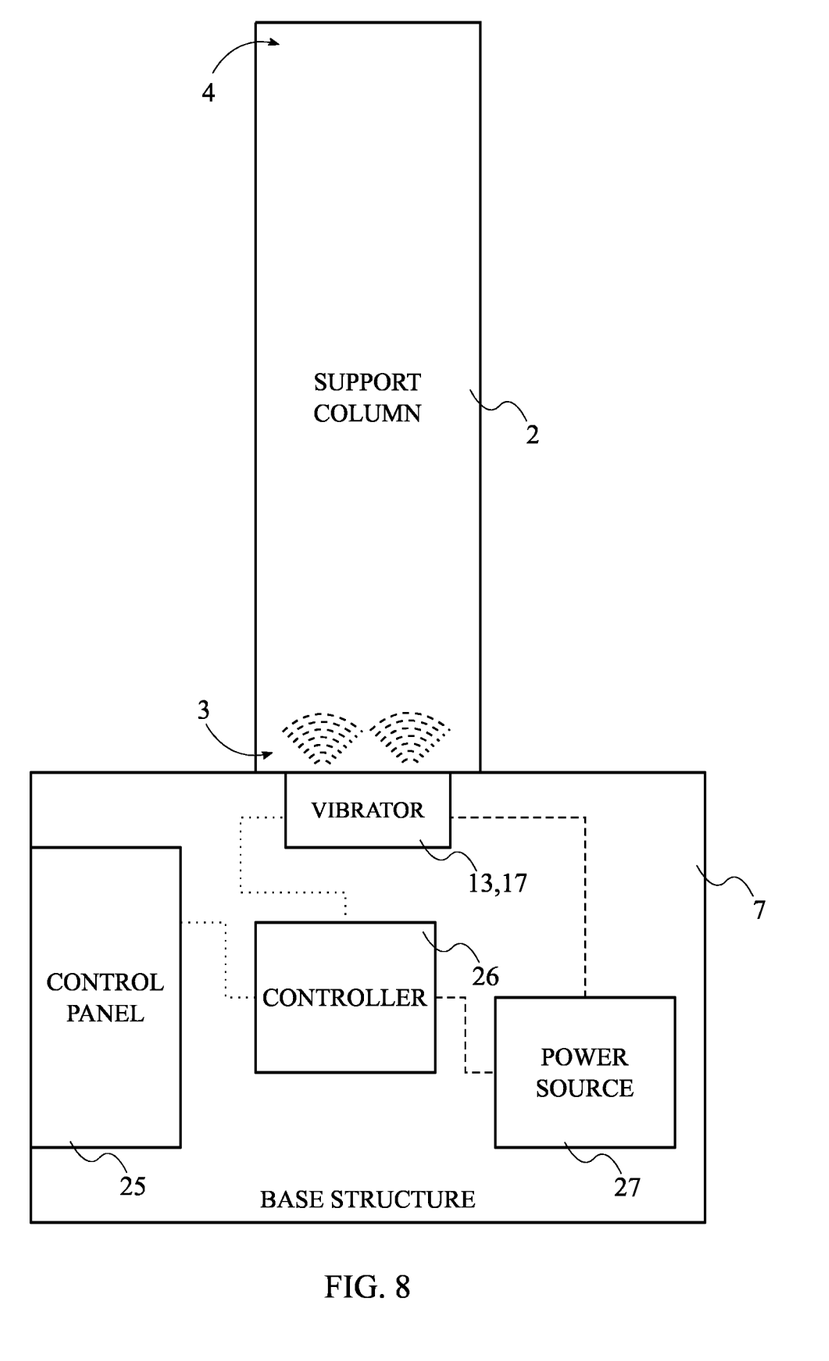
FIG. 8 is a schematic view showing the agitation mechanism as a vibrator, wherein the electronic connections are shown as dotted path lines, wherein the electrical connections are shown as dashed path lines, and wherein the vibrational connections are shown as curved dashed path lines.

In another embodiment, the user can choose for the plurality of bristle sets 5 to vibrate to clean the trailer's exterior surfaces more gently. In this embodiment, the agitation mechanism 13 is a vibrator 17 designed to transmit vibrational forces to the plurality of bristle sets 5, as can be seen in FIG. 8. Thus, the vibrator 17 is in vibrational communication with the first column end 3 to vibrate each of the plurality of bristle sets 5 on the support column 2. Moreover, the controller 26 and the vibrator 17 are mounted within the base structure 7 to isolate the controller 26 and the vibrator 17 from the surroundings. Like the motorized embodiment, the controller 26 is electronically connected to the control panel 25 and the vibrator 17. This enables the user to manage the operation of the vibrator 17 according to the user inputs on the control panel 25. Further, the power source 27 is electrically connected to the controller 26 and the vibrator 17 to provide the voltage necessary for the operation of the vibrator 17. Furthermore, the controller 26 may further include a wireless module to enable the user to remotely control the present invention. The wireless module can be communicably connected to an external remote control or portable electronic device to receive signal commands from the user. In other embodiments, the present invention may utilize different oscillating mechanisms that move the plurality of bristle sets 5 in a desired pattern for more efficient cleaning of the trailer's exterior surfaces.

To clean the trailer's exterior surfaces, the user moves the base structure 7 using the wheel assembly 8 to position the support column 2 adjacent to the trailer. As can be seen in FIG. 3, the base structure 7 is moved close enough to the target trailer's wall so the plurality of bristle sets 5 is in contact with the trailer's wall. The roof carriage 9 is positioned on top of the trailer to help guide the at least one brush assembly 1 as the base structure 7 moves along the trailer. In some embodiments, the support column 2 may be a modular structure to enable the user to adjust the height of the at least one brush assembly 1 to match the trailer's height by removing or adding portions of the support column 2. Further, each modular section of the support column 2 may include multiple sets of bristles that vary in diameter. Alternatively, the support column 2 may further include a length-adjusting mechanism integrated into the support column 2 that enables the user to adjust the height of the support column 2. Furthermore, in some embodiments the present invention may include a splash shield positioned surrounding the support column 2 and adjacent to the user to protect the user from debris or water splash during the cleaning of the trailer. The splash shield can be mounted onto the base structure 7 and can be removed if desired.

The at least one brush assembly 1 enables the user to clean one of the trailer's lateral wall at a time. However, in some embodiments, the present invention can be configured to enable the cleaning of multiple surfaces at a time. As can be seen in FIG. 9, the at least one brush assembly 1 may be a first brush assembly 28 and a second brush assembly 29 that can be positioned adjacent to the opposing lateral walls of the trailer for simultaneous cleaning. The at least one extension arm 12 may also be a first extension arm 30 and a second extension arm 31 to keep the first brush assembly 28 connected to the second brush assembly 29. The first extension arm 30 is laterally connected to the carriage body 10 to secure the first extension arm 30 to the carriage body 10. Likewise, the second extension arm 31 is laterally connected to the carriage body 10, opposite to the first extension arm 30, to secure the second extension arm 31 to the carriage body 10. Further, the second column end 4 of the first brush assembly 28 is terminally mounted to the first extension arm 30, opposite the carriage body 10, to position the first brush assembly 28 offset to the carriage body 10. Similarly, the second column end 4 of the second brush assembly 29 is terminally mounted to the second extension arm 31, opposite the carriage body 10. Thus, the second brush assembly 29 is positioned offset to the carriage body 10 opposite to the first brush assembly 28, enabling the user to simultaneously clean two opposite trailer walls.

In addition to enabling the simultaneous cleaning of opposing trailer walls, the present invention can also enable simultaneous cleaning of adjacent trailer walls. To do so, the first extension arm 30 and the second extension arm 31 may each comprise a distal arm section 32, a proximal arm section 33, and an arm joint 34, as can be seen in FIG. 10. The distal arm section 32 and the proximal arm section 33 enable the corresponding extension arm to be bent into different configurations. The arm joint 34 facilitates the bending of the corresponding extension arm. The proximal arm section 33 is laterally connected to the carriage body 10 to secure the proximal arm section 33 to the carriage body 10. The distal arm section 32 is pivotably connected to the proximal arm section 33 by the arm joint 34 to enable the reconfiguration of the corresponding arm. The second column end 4 of the first brush assembly 28 is terminally mounted to the distal arm section 32 of the first extension arm 30, opposite to the proximal arm section 33 of the first extension arm 30, to secure the first brush assembly 28 to the first extension arm 30. The second column end 4 of the second brush assembly 29 is terminally mounted to the distal arm section 32 of the second extension arm 31, opposite to the proximal arm section 33 of the second extension arm 31, to secure the second brush assembly 29 to the second extension arm 31. Thus, the user can reposition the first brush assembly 28 to be positioned closer to the second brush assembly 29 so that the user can simultaneously clean two adjacent trailer walls. In other embodiments, the present invention can provide multiple accessories that further aid in the cleaning of the trailer's exterior surface.

Although the invention has been explained in relation to its preferred embodiment, it is to be understood that many other possible modifications and variations can be made without departing from the spirit and scope of the invention.

What is claimed is:
1. A mobile trailer-cleaning system comprising:
   at least one brush assembly;
   a roof carriage;
   an agitation mechanism;
   a steering assembly;
   the at least one brush assembly comprising a support column, a plurality of bristle sets, a base structure, and a wheel assembly;
   the roof carriage comprising a carriage body, a plurality of rollers, and at least one extension arm;
   the support column comprising a first column end and a second column end;
   the plurality of rollers being rotatably mounted to the carriage body;
   the carriage body being terminally mounted to the at least one extension arm;
   the second column end being terminally mounted to the at least one extension arm, opposite to the carriage body;
   the first column end being mounted adjacent to the base structure;
   the wheel assembly being mounted adjacent to the base structure, opposite to the first column end;
   the steering assembly being mounted adjacent to the base structure, in between the first column end and the wheel assembly;
   the plurality of bristle sets being distributed about the support column;
   each of the plurality of bristle sets being distributed along the support column; and,
   the plurality of bristle sets being laterally mounted onto the support column.

2. The mobile trailer-cleaning system as claimed in claim 1 comprising:
   at least one accelerator control;
   at least one drive system;
   the at least one accelerator control being mounted onto the steering assembly;
   the at least one drive system being mounted within the base structure;
   the at least one drive system being operatively coupled to the wheel assembly, wherein the at least one drive system is used to selectively accelerate rotation of the wheel assembly; and,
   the at least one accelerator control being operatively coupled to the at least one drive system, wherein the accelerator control is used to actuate the at least one drive system.

3. The mobile trailer-cleaning system as claimed in claim 1 comprising:
   at least one brake control;
   at least one brake mechanism;

the at least one brake control being mounted onto the steering assembly;

the at least one brake mechanism being operatively integrated into the wheel assembly, wherein the at least one brake mechanism is used to selectively decelerate rotation of the wheel assembly; and, the at least one brake control being operatively coupled to the at least one brake mechanism, wherein the at least one brake control is used to actuate the at least one brake mechanism.

4. The mobile trailer-cleaning system as claimed in claim 1 comprising:

the steering assembly comprising a first handlebar and a second handlebar; and, the first handlebar and the second handlebar being positioned adjacent to each other.

5. The mobile trailer-cleaning system as claimed in claim 1 comprising:

each of the plurality of bristle sets comprising a plurality of spring-loaded bristles; and, each of the plurality of spring-loaded bristles being configured to recoil from an agitated position to an equilibrium position.

6. The mobile trailer-cleaning system as claimed in claim 1 comprising:

a control panel;
a controller;
a power source;
the agitation mechanism being a motor;
the motor comprising a rotor and a stator;
the control panel being laterally mounted onto the base structure;
the controller and the stator being mounted within the base structure;
the power source being integrated into the base structure;
the first column end being rotatably mounted to the base structure;
the rotor being torsionally connected to the first column end;
the controller being electronically connected to the control panel and the motor; and,
the power source being electrically connected to the controller and the motor.

7. The mobile trailer-cleaning system as claimed in claim 1 comprising:

a control panel;
a controller;
a power source;
the agitation mechanism being a vibrator;
the control panel being laterally mounted onto the base structure;
the controller and the vibrator being mounted within the base structure;
the power source being integrated into the base structure;
the vibrator being in vibrational communication with the first column end;
the controller being electronically connected to the control panel and the vibrator; and,
the power source being electrically connected to the controller and the vibrator.

8. The mobile trailer-cleaning system as claimed in claim 1 comprising:

the at least one brush assembly being a first brush assembly and a second brush assembly;
the at least one extension arm being a first extension arm and a second extension arm;
the first extension arm being laterally connected to the carriage body;
the second extension arm being laterally connected to the carriage body, opposite to the first extension arm;
the second column end of the first brush assembly being terminally mounted to the first extension arm, opposite the carriage body; and,
the second column end of the second brush assembly being terminally mounted to the second extension arm, opposite the carriage body.

9. The mobile trailer-cleaning system as claimed in claim 8 comprising:

the first extension arm and the second extension arm each comprising a distal arm section, a proximal arm section, and an arm joint;
the proximal arm section being laterally connected to the carriage body;
the distal arm section being pivotably connected to the proximal arm section by the arm joint;
the second column end of the first brush assembly being terminally mounted to the distal arm section of the first extension arm, opposite to the proximal arm section of the first extension arm; and,
the second column end of the second brush assembly being terminally mounted to the distal arm section of the second extension arm, opposite to the proximal arm section of the second extension arm.

10. A mobile trailer-cleaning system comprising:

at least one brush assembly;
a roof carriage;
an agitation mechanism;
a steering assembly;
the at least one brush assembly comprising a support column, a plurality of bristle sets, a base structure, and a wheel assembly;
the roof carriage comprising a carriage body, a plurality of rollers, and at least one extension arm;
the support column comprising a first column end and a second column end;
the steering assembly comprising a first handlebar and a second handlebar;
the plurality of rollers being rotatably mounted to the carriage body;
the carriage body being terminally mounted to the at least one extension arm;
the second column end being terminally mounted to the at least one extension arm, opposite to the carriage body;
the first column end being mounted adjacent to the base structure;
the wheel assembly being mounted adjacent to the base structure, opposite to the first column end;
the steering assembly being mounted adjacent to the base structure, in between the first column end and the wheel assembly;
the plurality of bristle sets being distributed about the support column;
each of the plurality of bristle sets being distributed along the support column;
the plurality of bristle sets being laterally mounted onto the support column; and,
the first handlebar and the second handlebar being positioned adjacent to each other.

11. The mobile trailer-cleaning system as claimed in claim 10 comprising:

at least one accelerator control;
at least one drive system;

the at least one accelerator control being mounted onto the steering assembly;

the at least one drive system being mounted within the base structure;

the at least one drive system being operatively coupled to the wheel assembly, wherein the at least one drive system is used to selectively accelerate rotation of the wheel assembly; and, the at least one accelerator control being operatively coupled to the at least one drive system, wherein the accelerator control is used to actuate the at least one drive system.

12. The mobile trailer-cleaning system as claimed in claim 10 comprising:

at least one brake control;

at least one brake mechanism;

the at least one brake control being mounted onto the steering assembly;

the at least one brake mechanism being operatively integrated into the wheel assembly, wherein the at least one brake mechanism is used to selectively decelerate rotation of the wheel assembly; and, the at least one brake control being operatively coupled to the at least one brake mechanism, wherein the at least one brake control is used to actuate the at least one brake mechanism.

13. The mobile trailer-cleaning system as claimed in claim 10 comprising:

each of the plurality of bristle sets comprising a plurality of spring-loaded bristles; and, each of the plurality of spring-loaded bristles being configured to recoil from an agitated position to an equilibrium position.

14. The mobile trailer-cleaning system as claimed in claim 10 comprising:

a control panel;

a controller;

a power source;

the agitation mechanism being a motor;

the motor comprising a rotor and a stator;

the control panel being laterally mounted onto the base structure;

the controller and the stator being mounted within the base structure;

the power source being integrated into the base structure;

the first column end being rotatably mounted to the base structure;

the rotor being torsionally connected to the first column end;

the controller being electronically connected to the control panel and the motor; and, the power source being electrically connected to the controller and the motor.

15. The mobile trailer-cleaning system as claimed in claim 10 comprising:

a control panel;

a controller;

a power source;

the agitation mechanism being a vibrator;

the control panel being laterally mounted onto the base structure;

the controller and the vibrator being mounted within the base structure;

the power source being integrated into the base structure;

the vibrator being in vibrational communication with the first column end;

the controller being electronically connected to the control panel and the vibrator; and, the power source being electrically connected to the controller and the vibrator.

16. The mobile trailer-cleaning system as claimed in claim 10 comprising:

the at least one brush assembly being a first brush assembly and a second brush assembly;

the at least one extension arm being a first extension arm and a second extension arm;

the first extension arm and the second extension arm each comprising a distal arm section, a proximal arm section, and an arm joint;

the first extension arm being laterally connected to the carriage body;

the second extension arm being laterally connected to the carriage body, opposite to the first extension arm;

the second column end of the first brush assembly being terminally mounted to the first extension arm, opposite the carriage body;

the second column end of the second brush assembly being terminally mounted to the second extension arm, opposite the carriage body;

the proximal arm section being laterally connected to the carriage body;

the distal arm section being pivotably connected to the proximal arm section by the arm joint;

the second column end of the first brush assembly being terminally mounted to the distal arm section of the first extension arm, opposite to the proximal arm section of the first extension arm; and, the second column end of the second brush assembly being terminally mounted to the distal arm section of the second extension arm, opposite to the proximal arm section of the second extension arm.

* * * * *